US008570562B2

(12) United States Patent
Kim

(10) Patent No.: US 8,570,562 B2
(45) Date of Patent: Oct. 29, 2013

(54) IMAGE FORMING APPARATUS AND NETWORK CONNECTION METHOD THEREOF RELATES TO AN IMAGE FORMING APPARATUS WHICH SUPPORTS DIFFERENT NETWORK CONNECTIONS ACCORDING TO AN OPERATION MODE

(75) Inventor: Youn-jae Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 786 days.

(21) Appl. No.: 12/728,440

(22) Filed: Mar. 22, 2010

(65) Prior Publication Data

US 2011/0085197 A1 Apr. 14, 2011

(30) Foreign Application Priority Data

Oct. 14, 2009 (KR) ........................ 10-2009-0097730

(51) Int. Cl.
- *G06F 3/12* (2006.01)
- *H04N 1/00* (2006.01)
- *H04N 1/40* (2006.01)
- *H01H 85/02* (2006.01)
- *H01H 85/52* (2006.01)
- *H01H 71/20* (2006.01)
- *H01H 37/00* (2006.01)

(52) U.S. Cl.
USPC .......... 358/1.15; 358/1.1; 358/1.16; 358/443; 327/202; 327/216; 327/218; 327/298

(58) Field of Classification Search
USPC ........... 358/1.15, 1.1, 1.16, 501, 401, 426.03, 358/426.01, 426.04, 426.05, 426.07, 358/426.11, 426.12, 434, 435, 443, 444, 358/448, 469, 476, 482; 709/230, 201, 217, 709/220, 223, 227, 234, 235, 236, 237, 238, 709/239; 370/389, 395.53, 420, 218, 225, 370/229, 232, 234, 248, 282, 431, 474, 370/545; 710/15, 1, 4, 5, 3, 11, 14, 20, 21, 710/22, 25, 27, 31, 36, 48, 58, 100, 105, 710/117; 326/113, 106, 108, 62, 93, 37; 327/407, 202, 216, 218, 207, 242, 251, 327/252, 258, 261, 272, 291, 295, 298, 299, 327/334, 365

See application file for complete search history.

(56) References Cited

U.S. PATENT DOCUMENTS

2006/0212730 A1* 9/2006 Senda ............................ 713/300
2008/0123641 A1* 5/2008 Park ............................... 370/389

FOREIGN PATENT DOCUMENTS

KR 2004-72084 8/2004

OTHER PUBLICATIONS

Low, Using the RGMI to Interface with the Gigabit Ethernet MAC, Sep. 28, 2006, Xilink, XAPP692 v1.0.1, all pages.*

Primary Examiner — Ngon Nguyen
(74) Attorney, Agent, or Firm — Stanzione & Kim, LLP

(57) ABSTRACT

An image forming apparatus includes a communication interface unit to communicate with a network using a physical layer protocol (PHY), a first control unit that includes a first Media Access Controller (MAC) to perform Media Access Control for the PHY when the image forming apparatus operates in a normal mode, and to control the image forming apparatus, a second control unit that includes a second Media Access Controller (MAC) to perform Media Access Control for the PHY when the image forming apparatus operates in a power saving mode, and a switching unit to switch a data path between the PHY, the first MAC, and the second MAC according to the operation mode of the image forming apparatus.

17 Claims, 7 Drawing Sheets

IMAGE FORMING APPARATUS AND NETWORK CONNECTION METHOD THEREOF RELATES TO AN IMAGE FORMING APPARATUS WHICH SUPPORTS DIFFERENT NETWORK CONNECTIONS ACCORDING TO AN OPERATION MODE

CROSS-REFERENCE TO RELATED APPLICATIONS

This application claims priority under 35 U.S.C. §119 (a) from Korean Patent Application No. 10-2009-0097730, filed on Oct. 14, 2009, in the Korean Intellectual Property Office, the disclosure of which is incorporated herein by reference in its entirety.

BACKGROUND

1. Field of the Invention

The present general inventive concept relates to an image forming apparatus and a network connection method thereof. More particularly, the present general inventive concept relates to an image forming apparatus which supports different network connections according to an operation mode by switching a data path with a network according to the operation mode, and a network connection method thereof.

2. Description of the Related Art

Image forming apparatuses generate, print, receive, and transmit image data. Examples of image forming apparatus are printers, scanners, copiers, fax machines, and multifunction peripherals incorporating these functions.

In order to reduce power consumption in a power saving mode, image forming apparatuses may have a low power controller as well as a main controller to control printing. That is, since a networking function of the image forming apparatuses has to be maintained in the power saving mode, a low power controller to perform only a simple networking function is provided to reduce power consumption and support the networking function in the power saving mode.

However, in the image forming apparatuses having the conventional low power controller, a network packet is transmitted to the main controller through the low power controller even in a normal mode. More specifically, since the low power controller receives a network packet, stores the network packet in a memory, and transmits the network packet to the main controller, the network speed is affected by performance of the low power controller as well as performance of the main controller in the normal mode.

Accordingly, in order to enhance the network speed of the image forming apparatuses, performance of the lower power controller should also be enhanced. However, if performance of the lower power controller is enhanced, power consumption of the low power controller is increased in the low power mode.

SUMMARY

The present general inventive concept provides an image forming apparatus which supports different network connections according to an operation mode by switching a data path with a network according to the operation mode, and a network connection method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus to operate in a plurality of operation modes, the image forming apparatus including a communication interface unit to communicate with a network using a physical layer protocol (PHY), a first control unit including a first Media Access Controller (MAC) to perform Media Access Control for the PHY when the image forming apparatus operates in a normal mode, and to control the image forming apparatus, a second control unit including a second Media Access Controller (MAC) to perform Media Access Control for the PHY when the image forming apparatus operates in a power saving mode, and a switching unit to switch a data path between the PHY, the first MAC, and the second MAC according to the operation mode of the image forming apparatus.

When the image forming apparatus is in the normal mode, the switching unit may form a data path between the PHY and the first MAC, and when the image forming apparatus is in the power saving mode, the switching unit may form a data path between the PHY and the second MAC.

The switching unit may include a first flip-flop to transmit data to or to receive data from the PHY, a second flip-flop to transmit data to or to receive data from the first MAC, a third flip-flop to transmit data to or to receive data from the second MAC, a multiplexer (MUX) to transmit data selectively from the second flip-flop or the third flip-flop to the first flip-flop, or to transmit data from the first flip-flop selectively to the second flip-flop or the third flip-flop, and a selection unit to control the MUX according to data reception of the second flip-flop or the third flip-flop and according to the operation mode of the image forming apparatus.

The switching unit may be provided in the second control unit.

The second control unit may further include a memory to store data transmitted from the communication interface unit, and a data processor to analyze and to process the stored data.

If the stored data are data related to a printing job, the data processor may inform the first control unit that the printing job is received.

If the first control unit receives a message informing that the printing job is received from the second control unit, the first control unit may read out the data related to the printing job from the memory and prints the printing job.

If the first control unit receives a message informing that the printing job is received from the second control unit, the first control unit may control the communication interface unit to request retransmission of the data related to the printing job.

When the image forming apparatus is in the normal mode, the second control unit may operate in a low power mode or is turned off.

The data path may be connected through at least one Media Independent Interface (MII), Reduced Media Independent Interface (RMII), Gigabit Media Independent Interface (GMII) and Reduced Gigabit Media Independent Interface (RGMII).

Example embodiments of the present general inventive concept may also be achieved by providing a network connection method of an image forming apparatus which is connected to a network using a physical layer protocol (PHY) and operates in a plurality of operation modes, the method including determining the operation mode of the image forming apparatus, forming a first data path between a first control unit, which includes a first Media Access Controller (MAC) to perform Media Access Control for the PHY when the image forming apparatus operates in a normal mode and which controls functions of the image forming apparatus, and the PHY, forming a second data path between a second control unit, which includes a second Media Access Controller (MAC) to perform Media Access Control for the PHY when the image forming apparatus operates in a power saving mode and which operates with lower power than the first control unit, and the PHY, and switching to the first data path or the second data path according to the operation mode of the image forming apparatus.

The determining operation may be performed by the second control unit.

In the switching operation, if printing data are received through the second data path between the second MAC and the PHY, the second data path may be switched to the first data path.

The method may further include informing the first control unit with the second control unit that data related to a printing job are received.

In the informing operation, the data related to the printing job may be transmitted to the first control unit.

The method may further include requesting with the first control unit that a network which transmitted the printing job retransmit the data related to the printing job.

The first data path and the second data path may be connected through at least one Media Independent Interface (MII), Reduced Media Independent Interface (RMII), Gigabit Media Independent Interface (GMII) and Reduced Gigabit Media Independent Interface (RGMII).

Example embodiments of the present general inventive concept may also provide a method of connecting an image forming apparatus to a network with a physical layer protocol (PHY), the method including determining an operation mode of the image forming apparatus, switching to a first data path between a first control unit of the image forming apparatus and the PHY when it is determined that the operation mode is a normal operation mode, and switching to a second data path between a second control unit and the PHY when it is determined that the operation mode is a power saving mode.

The method may include determining whether printing data is received through the second data path, and switching to the first data path when it is determined that printing data is received through the second data path.

The method may include requesting with the first control unit that the network that transmitted the printing data retransmit the printing data.

Example embodiments of the present general inventive concept may also provide an image forming apparatus, including a communication interface unit to communicate with a network with a physical layer protocol (PHY), a first control unit to control the image forming apparatus when it operates in a normal mode, a second control unit to control the image forming apparatus when it operates in a power saving mode, and a switching unit to switch a data path between the PHY, the first control unit, and the second control unit according to the operation mode of the image forming apparatus.

The image forming apparatus may include where the first control unit includes a first Media Access Controller to perform Media Access Control for the PHY, and the second control unit includes a second Media Access Controller to perform Media Access Control for the PHY.

The image forming apparatus may include where the second control unit has a memory to store data transmitted from the communication interface unit, and a data processor to determine whether the transmitted data is printing data.

The image forming apparatus may include where the data processor informs the first control unit when it is determined that printing data is received, and the first control unit reads out the printing data from the memory to print the printing job.

The image forming apparatus may include where if the first control unit receives a message informing that the printing job is received from the second control unit, the first control unit controls the communication interface unit to request retransmission of the printing data.

Exemplary embodiments of the present general inventive concept also provide an image forming apparatus, including a communication interface to communicate with an external device to receive data, a first control unit to control a printing engine to receive the data in a normal mode to form an image, and a second control unit to control a printing engine unit to receive the data in a power saving mode.

The image forming apparatus may also include a switching unit to receive the normal mode and the power saving mode from the first and second controller and to set a data path from the external device to the respective first and second control units.

BRIEF DESCRIPTION OF THE DRAWINGS

These and/or other aspects and utilities of the present general inventive will become apparent and more readily appreciated from the following description of the embodiments, taken in conjunction with the accompanying drawings of which.

DETAILED DESCRIPTION OF THE EMBODIMENTS

Figure 1:
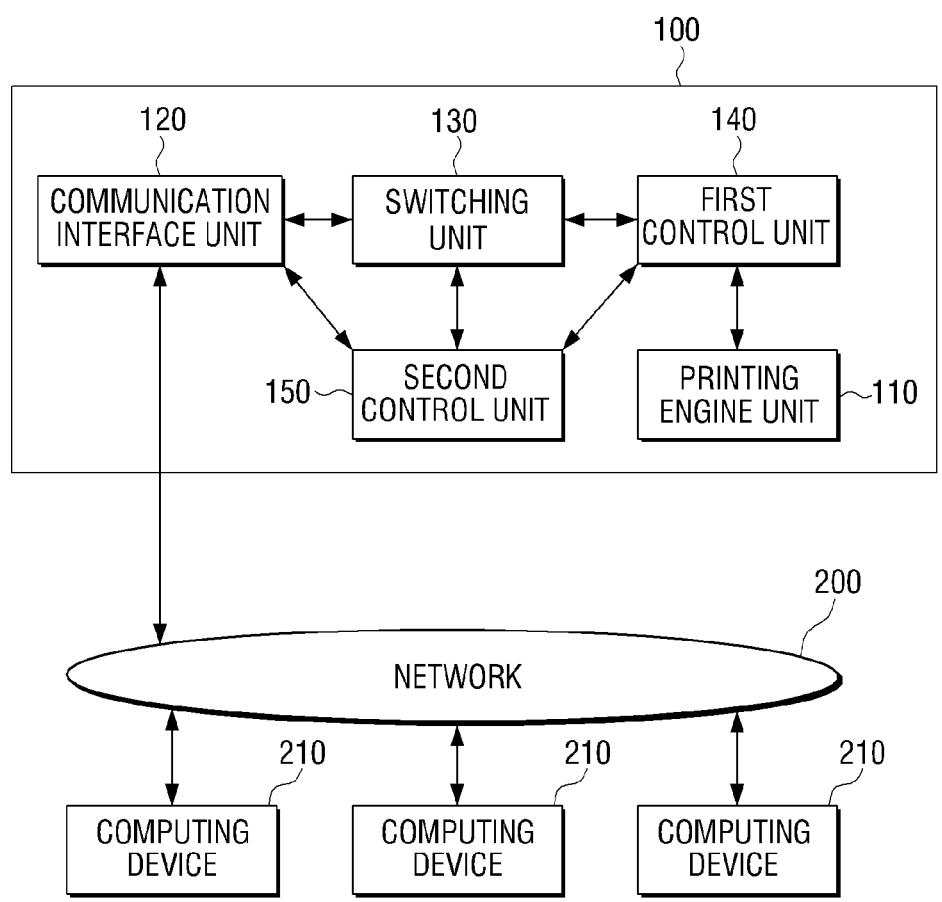
FIG. 1 is a block diagram illustrating a configuration of an image forming apparatus according to exemplary embodiments of the present general inventive concept.

Reference will now be made in detail to the present embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a configuration of an image forming apparatus 100 according to exemplary embodiments of the present general inventive concept.

Referring to FIG. 1, the image forming apparatus 100 may include a printing engine unit 110, a communication interface unit 120, a switching unit 130, a first control unit 140, and a second control unit 150.

The printing engine unit 110 outputs printing data. More specifically, the printing engine unit 110 prints printing data received through the communication interface unit 120 or printing data stored in the main memory 160 onto a printing medium (e.g., paper or any other suitable medium to carry out the exemplary embodiments of the present general inventive concept, etc.).

The communication interface unit 120 can be connected to a network 200 to communicate with the network 200. The network 200 may be any suitable wired and/or wireless communication network. One or more computing devices 210 may be communicative coupled to the network 200, and may communicate with the image forming apparatus 100. The one or more computing devices 210 may be a computer, a server, a printing control device, a smartphone, a personal digital assistant (PDA) device, a media and/or multi-media device, or any other suitable device to carry out the exemplary embodiments of the present general inventive concept as described herein.

Figure 2:
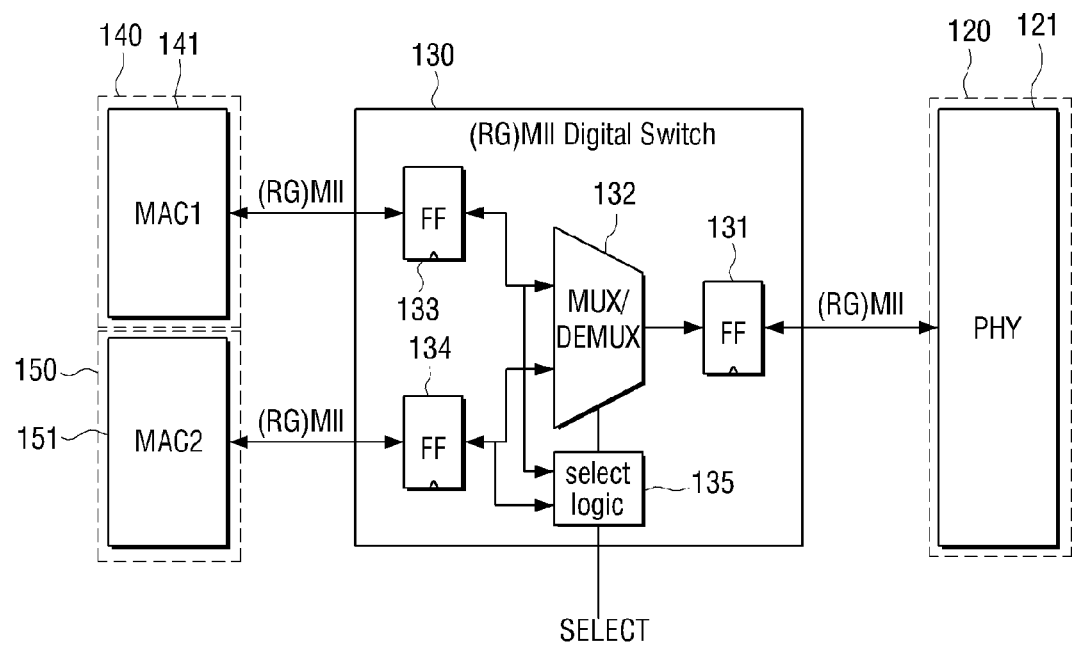
FIG. 2 is a block diagram illustrating the switching unit illustrated in FIG. 1.

The communication interface unit 120 includes a physical layer protocol (PHY) 121 as illustrated, for example, in FIG. 2. The PHY 121 is a protocol to transmit raw bits over a physical link connecting network nodes (e.g., communication points, communication links, etc.). A bit stream may be grouped into words or symbols and converted to a physical signal (e.g., a physical layer protocol such as PHY 121) that is transmitted over a hardware transmission medium. The PHY 121 can transmit the raw bits of printing data (e.g., from the printing engine 110) from the communication interface unit 120 to the one or more computing devices 210 communicatively coupled to the network 200. That is, the printing data can be transmitted as a physical signal having the raw bits with the PHY 121.

The communication unit 120 can receive printing data and diverse control data from a server or a printing control device (e.g., from a computing device 210 via the network 200), which is connected to the network 200, using the PHY 121. The communication interface unit 120 can transmit a response to the received control data through the PHY 121. The PHY 121 can be a protocol to transmit a bit flow through a physical medium, which transmits and receives data in consideration of interface property between the image forming apparatus 100 and the network 200.

The switching unit 130 can be connected to the first control unit 140, the second control unit 150 and the communication interface unit 120, and can switch a data path with the communication interface unit 120, the first control unit 140 and the second control unit 150 according to an operation mode of the image forming apparatus 100. The first control unit 140, the second control 150, and/or any other suitable controller to carry out the exemplary embodiments of the present general inventive concept may control the operation of the image forming apparatus 100 in a plurality of operation modes.

For example, the first control unit 140 and/or the second control unit 150 may control the image forming apparatus to operate in a normal mode or a power saving mode. When the image forming apparatus 100 is controlled so as to operate in a normal mode, power can be provided to at least the print engine unit 110, the first control unit 140, the switching unit 130, and the communication interface 120. In the normal operation mode, the second control unit 150 may be controlled by the first control unit 140 to operate in a lower power mode or be turned off.

More specifically, when the image forming apparatus 100 is in a normal mode (e.g., where the normal mode may be set by the first control unit 140, the second control unit 150, or any other suitable controller to carry out the exemplary embodiments of the present general inventive concept), the switching unit 130 can form a data path between the communication interface unit 120 and the first control unit 140, so if the switching unit 130 receives printing data or diverse control data from the communication interface unit 120, the switching unit 130 can transmit the printing data or the diverse control data to the first control unit 140, and if the switching unit 130 receives a response from the first control unit 140, the switching unit 130 can transmit the response to the communication interface unit 120.

When the image forming apparatus 100 is operated in the power saving mode, the image forming apparatus may decrease and/or cut off power to the printing engine unit 110. The second control unit 150 may provide a networking function when the image forming apparatus 100 is operated in the power saving mode. That is, the second control unit 150 can be coupled to the communication interface unit 120, and can monitor communications received by the communication interface unit 120 to determine if any print commands are received. The second control unit 150 may be directly communicatively coupled with the communication interface unit 120, and/or may be communicatively coupled to the communication interface unit 120 via the switching unit 130. When the second control unit 150 determines that print commands are received, power may be provided to the printing engine unit 110, and/or a signal may be provided to the first control unit 140 such that the first control unit 140 controls the image forming apparatus 100 to operate in the normal mode to perform a print operation. For example, the second control unit can transmit a signal to the switching unit 130, such that the switching unit 130 can switch such that the first control unit 140 communicates with the PHY 121 of the communication interface unit 120 and can receive, e.g., print data to be printed.

When the image forming apparatus 100 is in a power saving mode, the switching unit 130 can form a data path between the communication interface unit 120 and the second control unit 150, so if the switching unit 130 receives diverse control data from the communication interface unit 120, the switching unit 130 can transmit the diverse control data to the second control unit 150, and if the switching unit 130 receives a response from the second control unit 150, the switching unit 130 transmits the response to the communication interface unit 120.

The switching unit 130 may include a first flip-flop 131, a second flip-flop 133, a third flip-flop 134, a multiplexer (MUX) 132 and a select logic 135. Detailed structure of the switching unit 130 is described with reference to FIG. 2.

The first flip-flop 131 can transmit data to and can receive data from the communication interface unit 120. More specifically, the first flip-flop 131 can temporarily store data transmitted between the PHY 121 of the communication interface unit 120 and the MUX 132, and can transmit or receive data according to the operation timing. That is, when in a first operational state, the first flip-flop 131 may receive and temporarily store data from the communication interface unit 120, and when in a second operational state, the first flip-flop may transmit information to the communication interface unit 120.

The second flip-flop 133 can transmit data to and receive data from the first control unit 140. More specifically, the second flip-flop 133 can temporarily store data that is transmitted between a first Media Access Controller (MAC) 141 of the first control unit 140 and the MUX 132, and can transmit or receive data according to the operation timing.

The third flip-flop 134 can transmit data to and receive data from the second control unit 150. More specifically, the third flip-flop 134 can temporarily store data transmitted between a second Media Access Controller (MAC) 151 of the second control unit 150 and the MUX 132, and can transmit or receive data according to the operation timing.

The MUX 132 can switch a data path between the communication interface unit 120, the first control unit 140, and the second control unit 150. More specifically, the MUX 132 can transmit data selectively from the second flip-flop 133 or the third flip-flop 134 to the first flip-flop 131, and can transmit data from the first flip-flop 131 selectively to the second flip-flop 133 or the third flip-flop 134.

For example, in the normal mode, the MUX 132 can form a first data path to transmit data from the second flip-flop 133 to the first flip-flop 131 and to transmit data from the first flip-flop 131 to the second flip-flop 133. In the power saving mode, the MUX 132 can form a first data path to transmit data from the third flip-flop 134 to the first flip-flop 131 and can transmit data from the first flip-flop 131 to the third flip-flop 134.

The select logic 135 can control the operation of the MUX 132 according to the operation mode of the image forming apparatus 100 and according to reception of data by the second flip-flop 133 or the third flip-flop 134. More specifically, if the image forming apparatus 100 is in the normal mode, the select logic 135 can control the MUX 132 to transmit data from the first flip-flop 131 to the second flip-flop 133, and if the image forming apparatus 100 is in the power saving mode, the select logic 135 can control the MUX 132 to transmit data from the first flip-flop 131 to the third flip-flop 134.

The select logic 135 can control the MUX 132 to transmit data from the second flip-flop 133 or the third flip-flop 134 to the first flip-flop 131 according to reception of data by the second flip-flop 133 or the third flip-flop 134.

Figure 6:
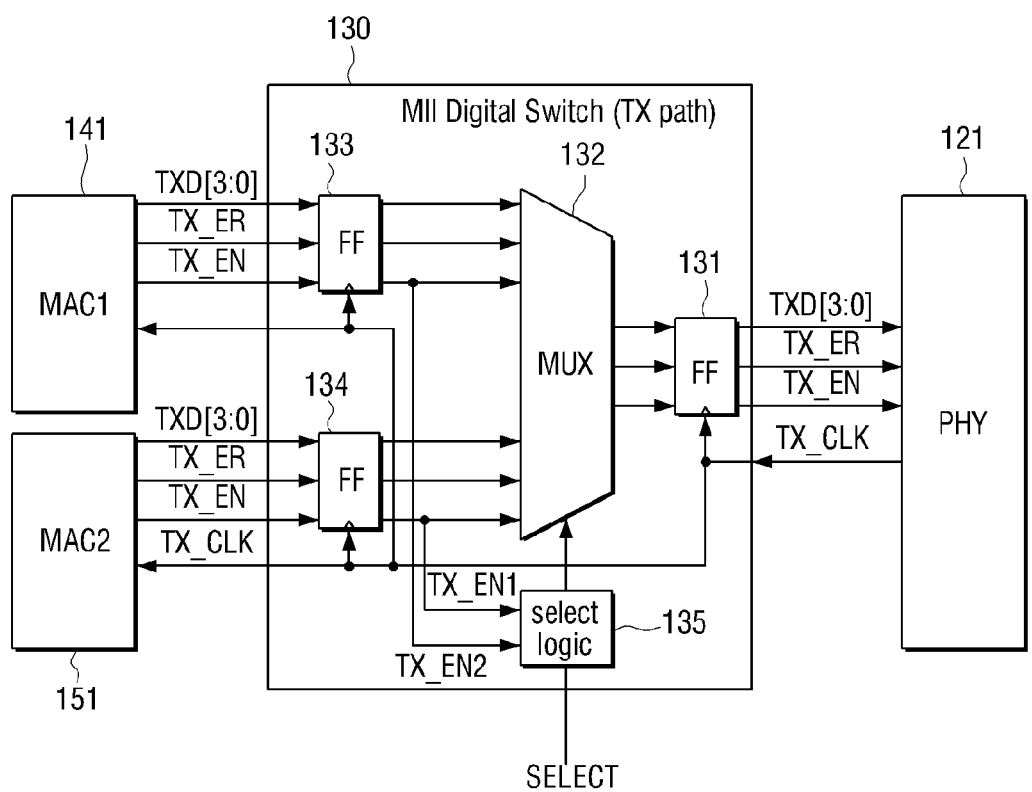
FIG. 6 is a detailed block diagram illustrating the switching unit illustrated in FIG. 1.

In the exemplary embodiments of the present general inventive concept illustrated in FIG. 2, the switching unit 130 may include flip-flops, and may also include other buffers such as latches or any other suitable devices to carry out the exemplary embodiments of the present general inventive concept. Furthermore, in the exemplary embodiments of the present general inventive concept illustrated in FIG. 2, the MUX 132 can perform functions of both a multiplexer and a demulplexer, and may also include a TX path (i.e., a transmission path) and an RX path (i.e., a reception path) as illustrated in FIG. 6.

The first control unit 140 can control the functions of the image forming apparatus 100 when the image forming apparatus 100 is in the normal mode. More specifically, the first control unit 140 can control one or more functions of the image forming apparatus 100, that is, processes a printing job, scanned data, and an image or can control components of the image forming apparatus 100 to process such functions.

The first control unit 140 may include the first MAC 141 to perform Media Access Control for the PHY 121 of the communication interface unit 120 in the normal mode. More specifically, if the image forming apparatus 100 is in the normal mode, the first control unit 140 can receive data from the network 200 through the switching unit 130 using the first MAC 141, and can transmit a response signal to a corresponding network device (e.g., at least one computing device 210, etc.) through the switching unit 130 and the communication interface unit 120.

The second control unit 150 can control the communication interface unit 120 when the image forming apparatus 100 is in the power saving mode. More specifically, the second control unit 150 can be a power saving controller to provide a networking function when the image forming apparatus 100 is in the power saving mode.

When the image forming apparatus 100 is in the normal mode, the networking function may be performed only by the first control unit 140, so the second control unit 150 may operate in a low power mode or be turned off. A detailed configuration of the second control unit 150 is described with reference to FIG. 3.

Figure 3:
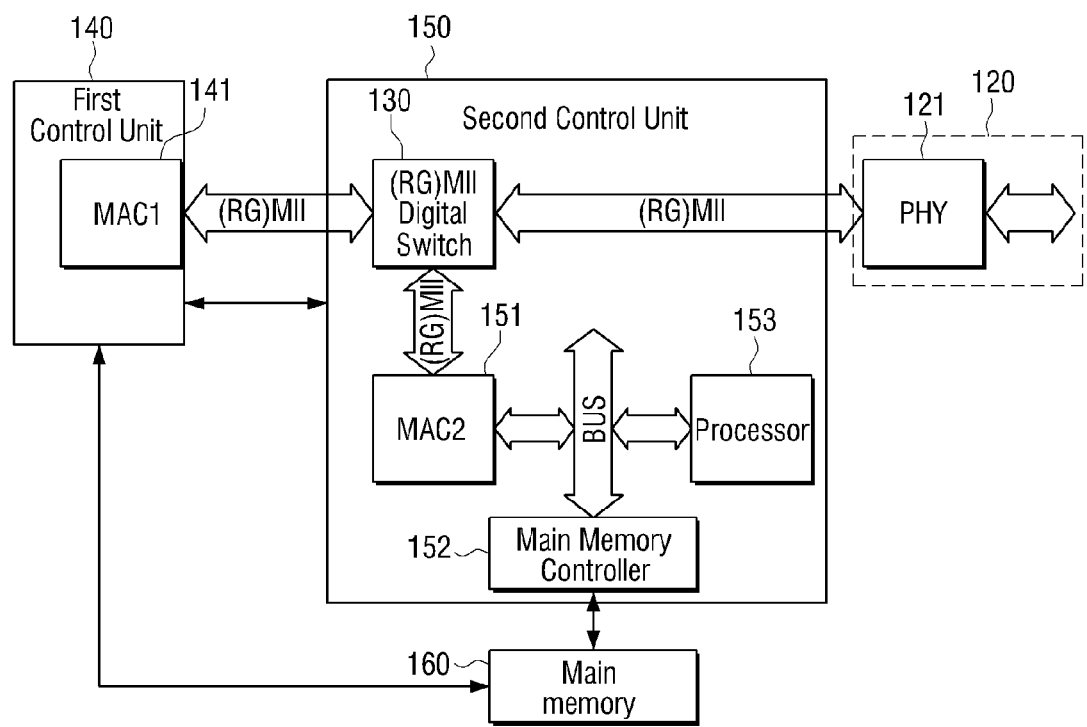
FIG. 3 is a block diagram illustrating an image forming apparatus according to exemplary embodiments of the present general inventive concept.

FIG. 3 is a block diagram illustrating a configuration of an image forming apparatus according to exemplary embodiments of the present general inventive concept.

Referring to FIG. 3, the image forming apparatus 100 may include a communication interface unit 120, a first control unit 140, a second control unit 150 and a main memory 160. As illustrated in FIG. 3, the image forming apparatus 100 can include a switching unit 130 in the second control unit 150. The second control unit 150 of FIG. 3 is similar to that of the second control unit 140 of FIG. 4 other than inclusion of the switching unit 130.

The communication interface unit 120 can include the PHY 121. The PHY 121 can transmit data to and can receive data from the switching unit 130 in the second control unit 150. More specifically, the PHY 121 can receive printing data and control data from a server (e.g., a server that is the computing device 210) which is connected to the network (e.g., the network 200) or a network device (e.g., one or more computing devices 210) such as a printing control device, and can transmit the printing data and the diverse control data to the switching unit 130. The communication interface unit 120 can transmit data received form the switching unit 130 to a network device which is connected to the network 200.

The PHY 121, the switching unit 130, a first MAC 141, and a second MAC 151 may be connected to one another through interface methods such as Media Independent Interface (MII), Reduced Media Independent Interface (RMII), Gigabit Media Independent Interface (GMII) and Reduced Gigabit Media Independent Interface (RGMII), and/or any other suitable interface to carry out the exemplary embodiments of the present general inventive concepts as disclosed herein.

The first control unit 140 can control the functions of the image forming apparatus 100, and can include the first MAC 141. The first MAC 141 can perform Media Access Control for the PHY 121 of the communication interface unit 120. Since detailed operation of the first MAC 141 has been described above with reference to FIG. 1, detailed description is not repeated.

The second control unit 150 can control the communication interface unit 120 when the image forming apparatus 100 is in the power saving mode. More specifically, the second control unit 150 may include the switching unit 130, a second MAC 151, a main memory controller 152, and a data processor 153. In the exemplary embodiments of the present general inventive concepts illustrated in FIG. 3, the switching unit 130 is included in the second control unit 150, but may also be provided as a separate element outside the switching unit 130.

The switching unit 130 can be connected to the PHY 121, the first MAC 141 and the second MAC 151, and can switch a data path with the PHY 121, the first MAC 141 and the second MAC 151 according to the operation mode of the image forming apparatus 100.

More specifically, when the image forming apparatus 100 is in the normal mode, the switching unit 130 can form a data path between the PHY 121 of the communication interface unit 120 and the first MAC 141 of the first control unit 140, so if the switching unit 130 receives printing data or diverse control data from the PHY 121 of the communication interface unit 120, the switching unit 130 can transmit the printing data or the diverse control data to the first MAC 141 of the first control unit 140, and if the switching unit 130 receives a response from the first MAC 141 of the first control unit 140, the switching unit 130 can transmit the response to the PHY 121 of the communication interface unit 120.

When the image forming apparatus 100 is in the power saving mode, the switching unit 130 can form a data path between the PHY 121 of the communication interface unit 120 and the second MAC 151 of the second control unit 150, so if the switching unit 130 receives diverse control data from the PHY 121 of the communication interface unit 120, the switching unit 130 can transmit the diverse control data to the second MAC 151, and if the switching unit 130 receives a response from the second MAC 151, the switching unit 130 can transmit the response to the PHY 121 of the communication interface unit 120.

The second MAC 151 can perform Media Access Control for the communication interface unit 120. More specifically, if the image forming apparatus 100 is in the power saving mode, the second MAC 151 can perform Media Access Control for the PHY 121 of the communication interface unit 120.

The main memory controller 152 can be connected to the second MAC 151 and the data processor 153. More specifically, if the second MAC 151 receives data from the switching unit 130, the main memory controller 152 can control the main memory 160 to store the data, and the main memory controller 152 can read out data from the main memory 160 upon request of the data processor 153 and can transmit the data to the data processor 153.

The main memory 160 can store operation algorithms of the first control unit 140 and the second control unit 150, and can temporarily store data received through the communication interface unit 120. In exemplary embodiments of the present general inventive concept, the first control unit 140 and the second control unit 150 can share the single main memory 160. However, the first control unit 140 and the second control unit 150 each may also use a respective memory, or may also include a respective memory.

As described above, in the power saving mode, the image forming apparatus 100 according to exemplary embodiments of the present general inventive concept can perform the networking function using the second control unit 150 operating with low power.

In the normal mode, the image forming apparatus 100 can perform the networking function using, for example, only the first control unit 140, so the performance of the second control unit 150 does not affect the performance of the network of the image forming apparatus 100. In the normal mode, the second control unit 150 can operate in a low power mode or is turned off, so power consumption may be reduced.

Figure 4:
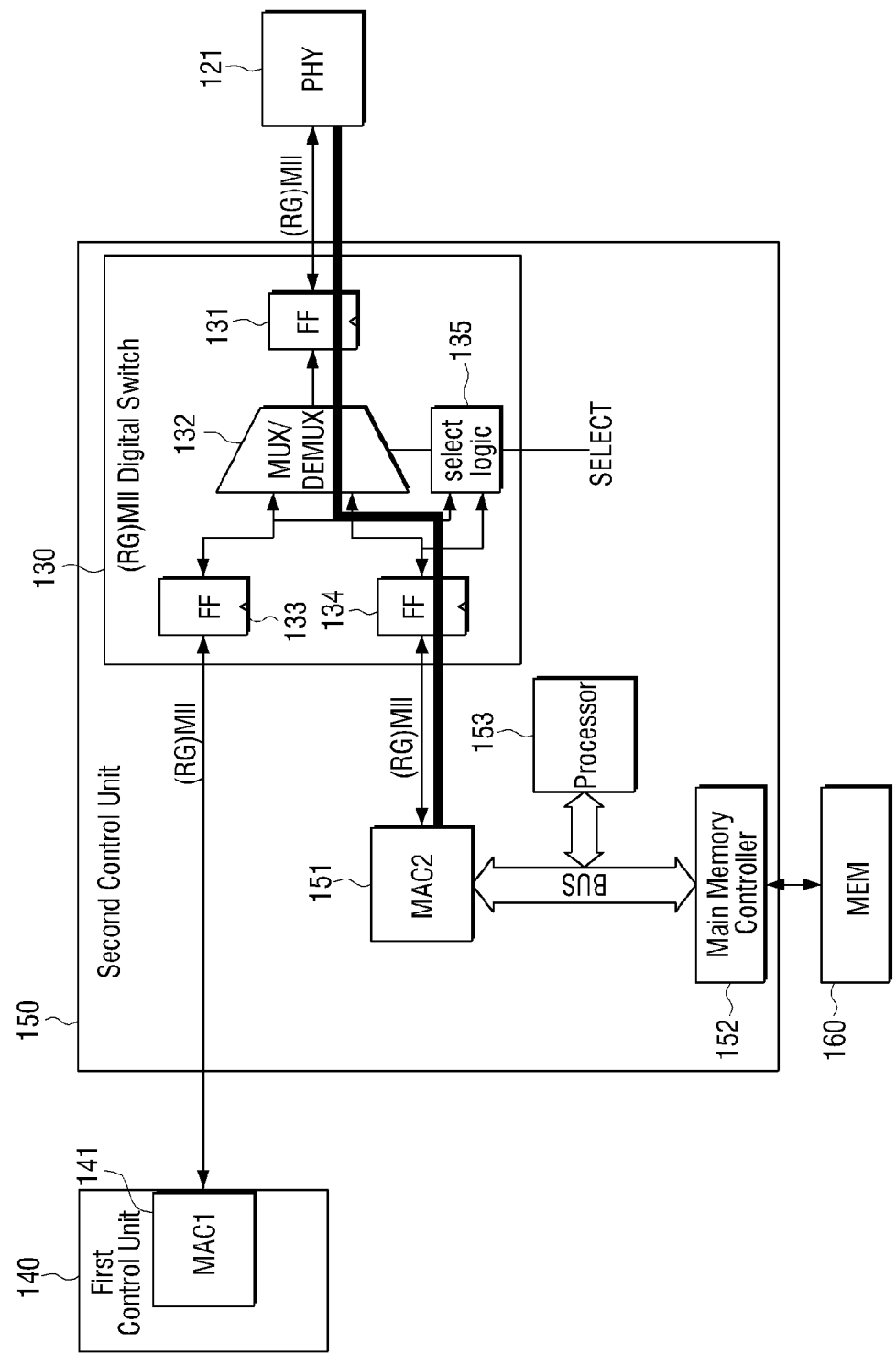
FIGS. 4 and 5 are block diagrams illustrating network connections according to an operation mode of an image forming apparatus according to exemplary embodiments of the present general inventive concept.
Figure 5:
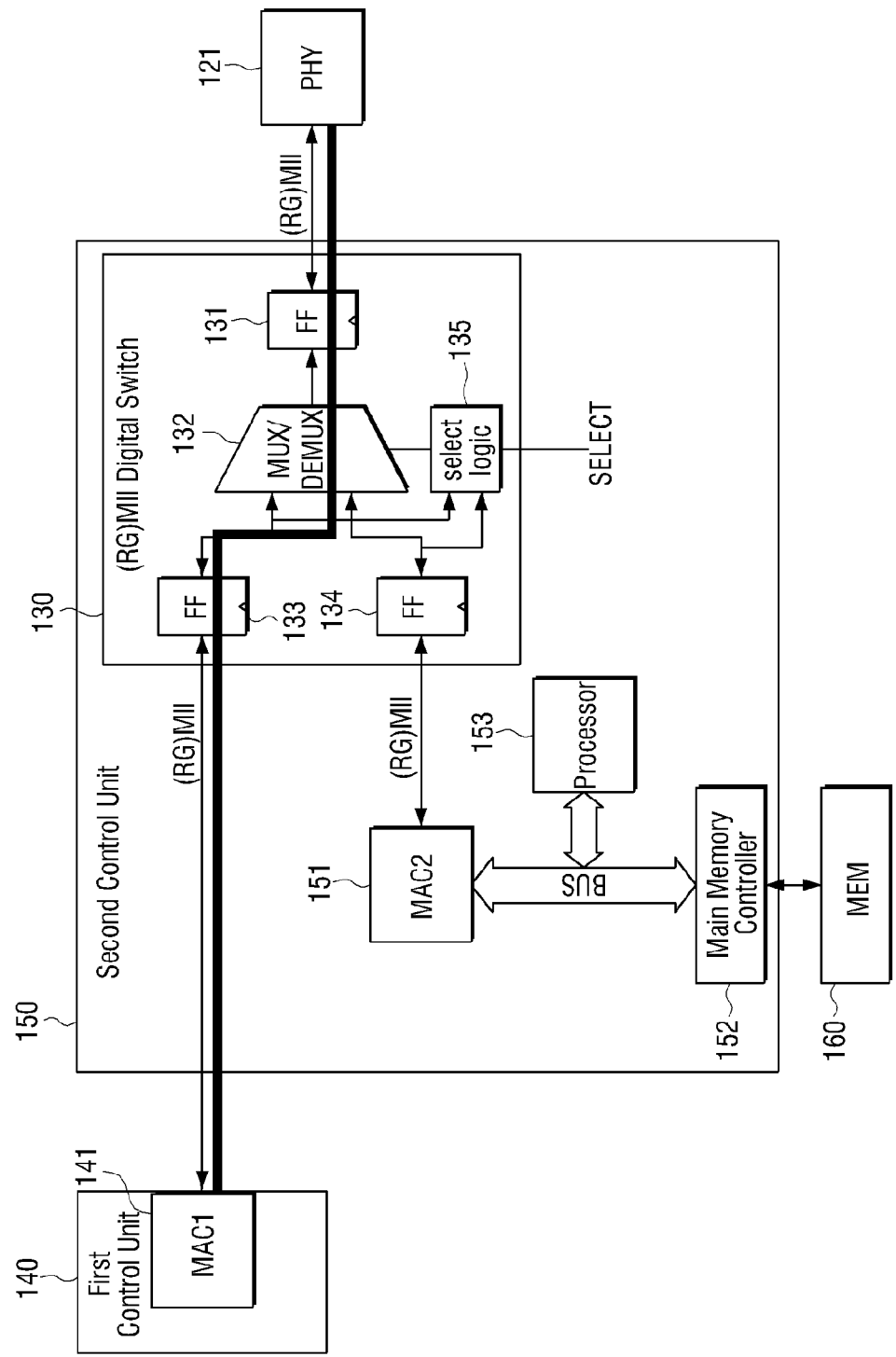

FIGS. 4 and 5 are block diagrams illustrating network connections according to the operation mode of the image forming apparatus 100 according to exemplary embodiments of the present general inventive concept. In FIGS. 4 and 5, the switching unit 130 is included in the second control unit 150, but may be provided as a separate element outside the second control unit 150 as illustrated in FIG. 1.

More specifically, FIG. 4 illustrates network connection in the power saving mode. Referring to FIG. 4, in the power saving mode, a first data path can be formed between the PHY 121, the communication interface unit 120, and the second MAC 151 of the second control unit 150. More specifically, in the power saving mode, if the PHY 121 receives data from an external network, the PHY 121 can transmit the data to the first flip-flop 131, and the select logic 135 of the switching unit 130 can control the MUX 132 to transmit the data stored in the first flip-flop 131 to the third flip-flop 134. If the data stored in the third flip-flop 134 are transmitted to the second MAC 151, the data processor 153 can process the data.

If the PHY 121 is set so as to receive a response to the received data transmitted to the second MAC 151, the second MAC 151 can transmit response data in reverse order and can control the communication interface unit 120 to transmit the response.

If the received data are data related to a printing job, the second MAC 151 can change the operation mode of the image forming apparatus 100. More specifically, if the received data are data indicating beginning of a printing job, the second MAC 151 can transmit a control signal to the selection unit 135 of the switching unit 120 so as to change the data path. The second MAC 151 may inform the first control unit 140 that the operation mode of the image forming apparatus 100 has been changed or that data related to a printing job are received.

If the received data are a printing job, the second MAC 151 can control the main memory controller 152 to store the received printing job in the main memory 160. The second MAC 151 may transmit an address of the main memory 160, in which the printing job is stored, to the first control unit 140, or may transmit the printing job data to the first control unit 140 upon request of the first control unit 140. The first control unit 140 and the second control unit 150 may transmit the printing job data through a Universal Serial Bus (USB) interface.

The first control unit 140 can be informed (e.g., via a data communication) by the second control unit 150 that the data related to the printing job are received, may change the operation mode of the image forming apparatus 100 into the normal mode, and may perform the printing job. In the above description, the second control unit 150 may change the operation mode of the image forming apparatus 100, but the operation mode of the image forming apparatus 100 may be changed by the first control unit 140.

The first control unit 140 may request the network device, which transmitted the data related to the printing job, to retransmit the data related to the printing job. More specifically, the first control unit 140 may receive the data related to the printing job from the second control unit 150, or may receive information on the address of the main memory 160, in which the data related to the printing job are stored, from the second control unit 150 and obtain the data related to the printing job using the information. Alternatively, the first control unit 140 may obtain the data related to the printing job by requesting the network device, which transmitted the data related to the printing job, to retransmit the data related to the printing job.

As described above, when the image forming apparatus 100 according to exemplary embodiments of the present general inventive concept is in the power saving mode, although the first control unit 140 is in the power saving mode or turned off, the second control unit 150 can perform the networking function using the second MAC 151, the main memory controller 152 and the data processor 153.

FIG. 5 illustrates network connections in the normal mode. Referring to FIG. 5, in the normal mode, a data path can be formed between the PHY 121, the communication interface unit 120 and the first MAC 141 of the first control unit 140. More specifically, in the normal mode, if the PHY 121 receives data from an external network, the PHY 121 can transmit the data to the first flip-flop 131 of the switching unit 130 and the select logic 135 of the switching unit 130 controls the MUX 132 to transmit the data stored in the first flip-flop 131 to the second flip-flop 133. If the data stored in the second flip-flop 133 are transmitted to the first MAC 141, the first control unit 140 performs the data.

If the PHY 121 is set so as to receive a response to the received data, the first control unit 140 can transmit response data in reverse order and can control the communication interface unit 120 to transmit the response.

If the received data are data related to a printing job, the first control unit 140 can perform the printing job using an element related to the printing job in the image forming apparatus 100.

As described above, when the image forming apparatus 100 is in the normal mode, the second MAC 151, the main memory controller 152, and the data processor 153 may not affect data transmission, so performance of the second control unit 150 may not affect performance of the network. In addition, in exemplary embodiments of the present general invention concept, the switching unit 130 is included in the second control unit 150, but if the switching unit 130 is provided as a separate element as illustrated in FIG. 1, in the normal mode the second control unit 150 can operate in the power saving mode or is turned off. Therefore, power consumption of the image forming apparatus 100 may be reduced in the normal mode.

FIG. 6 is a circuit diagram illustrating a TX (transmitter) path of the switching unit 130. More specifically, FIG. 6 illustrates a TX path of the switching unit 130 which may transmit data of the first control unit 140 or the second control unit 150 to the communication interface unit 120.

Referring to FIG. 6, the first MAC 141 of the first control unit 140 and the second MAC 151 of the second control unit 150 may transmit TXD[3:0], TX_ER, TX_EN and a clock frequency signal to, and/or may receive TXD[3:0], TX_ER, TX_EN, and a clock frequency signal from the switching unit 130. The PHY 121 of the communication interface unit 120 may transmit TXD[3:0], TX_ER and TX_clock frequency signal to, and/or receive TXD[3:0], TX_ER and TX_clock frequency signal from the switching unit 130. An RX path corresponding to the TX path can be provided to transmit data received through the communication interface unit 120 to the first control unit 140 or the second control unit 150.

Figure 7:
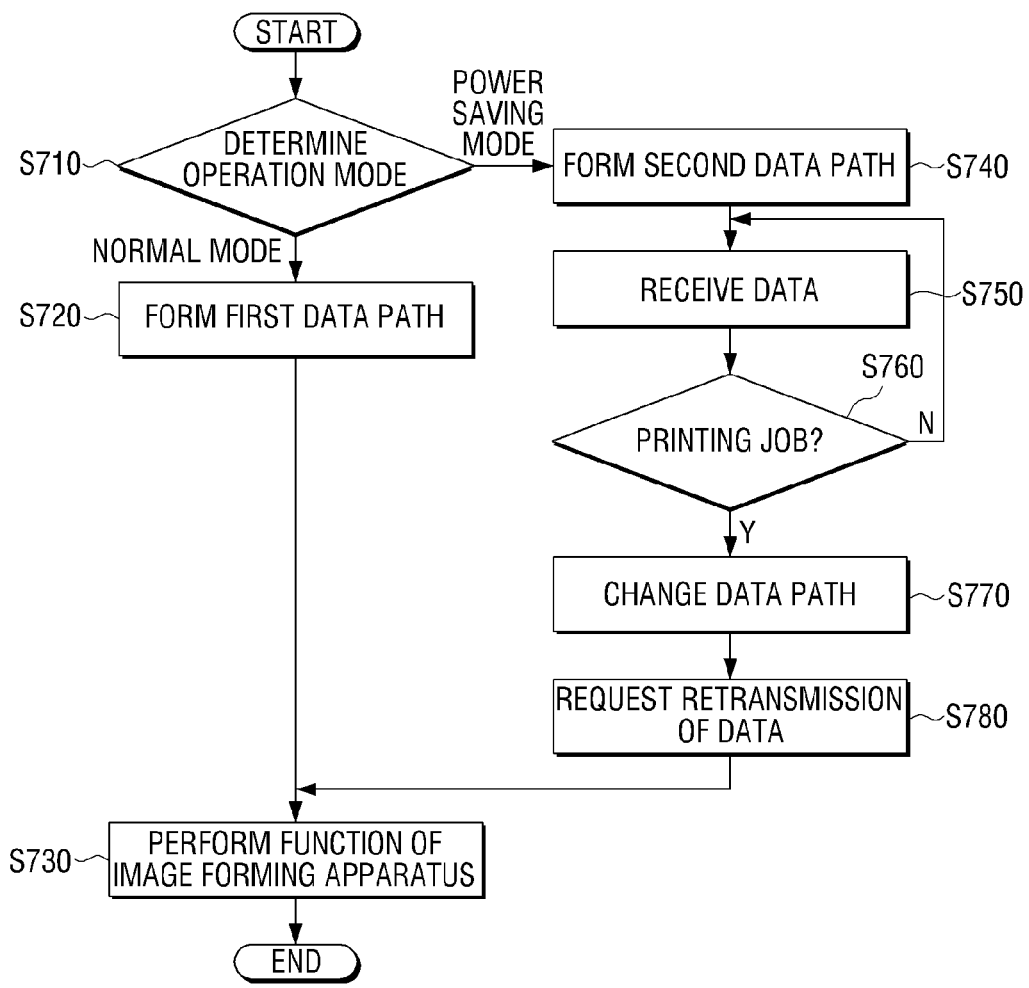
FIG. 7 is a flow chart illustrating a network connection method according to exemplary embodiments of the present general inventive concept.

FIG. 7 is a flow chart illustrating a network connection method according to exemplary embodiments of the present general inventive concept.

In operation S710, the operation mode of the image forming apparatus 100 can be determined. More specifically, it is determined whether the image forming apparatus 100 is in the normal mode or in the power saving mode, and operations may be performed to form a data path according to the determined operation mode. If the operation mode changes after a single data path is formed through the following process, the first data path and the second data path may be switched.

In operation S720, if the image forming apparatus 100 is in the normal mode, a first data path can be formed between the first control unit 140, which includes the first MAC 141 to perform MAC for the PHY 121 and controls the function of the image forming apparatus 100, and the PHY 121. Since detailed operation and configuration to form the first data path have been described with reference to FIGS. 1 to 4, detailed description is not repeated.

In operation S730, if a printing job is received through the first data path, the image forming apparatus 100 can perform the functions of the image forming apparatus 100. More specifically, if a printing job or a job related to the functions of the image forming apparatus 100 is received through the network, the image forming apparatus 100 can perform a corresponding function of the image forming apparatus 100.

In operation S740, if the image forming apparatus 100 is in the power saving mode, a second data path can be formed between the second control unit 150, which includes the second MAC 151 to perform MAC for the PHY 121 and operates with lower power than the first control unit 140, and the PHY 121. Since detailed operation and configuration to form the second data path have been described with reference to FIGS. 1, 2 and 5, detailed description is not repeated.

In operation S750, if data are received through the second data path, it is determined whether or not the received data are data related to a printing job in operation S760. More specifically, if the data received through the second data path are data requesting a response, the second control unit 150 can transmit a response signal through the second data path.

In operation S770, if the data received through the second data path are data related to a printing job, the data path may change so that the first control unit 140 can perform the printing job. More specifically, since the first control unit 140 performs a function related to a printing job, the second control unit 150 changes the operation mode of the image forming apparatus 100 so that the first control unit 140 can perform the printing job. The second data path can switch to the first data path. In FIG. 7, switching a data path is illustrated as a separate operation, but a data path may be switched through operation S710.

In operation S780, the first control unit 140 may request that a network device which transmitted the data related to the printing job retransmits the data. The first control unit 140 may receive the data related to the printing job directly from the second control unit 150.

As can be appreciated from the above description of the network connection method according to exemplary embodiments of the present general inventive concept, in the power saving mode, the second control unit 150 which consumes low power can provide a networking function of the image forming apparatus 100, and in the normal mode the first control unit 140 can provide a networking function of the image forming apparatus 100. In particular, in the normal mode, since the second control unit 150 may not perform the networking function, the second control unit 150 may not affect the performance of the network.

In the normal mode, since the second control unit 150 operates in the power saving mode or is turned off, power consumption may be reduced. The network connection method illustrated in FIG. 7 may be executed by image forming apparatuses as illustrated in FIG. 1 or FIG. 3, and may also be executed by image forming apparatuses having other configurations.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus to operate in a plurality of operation modes, the image forming apparatus comprising:
   a communication interface unit to communicate with a network using a physical layer protocol (PHY);
   a first control unit including a first Media Access Controller (MAC) to perform Media Access Control for the PHY when the image forming apparatus operates in a normal mode, and to control the image forming apparatus;
   a second control unit including a second Media Access Controller (MAC) to perform Media Access Control for the PHY when the image forming apparatus operates in a power saving mode; and
   a switching unit to switch a data path between the PHY, the first MAC, and the second MAC according to the operation mode of the image forming apparatus,
   wherein when the image forming apparatus is in the normal mode, the switching unit forms a first data path between the PHY and the first MAC, and when the image forming apparatus is in the power saving mode, the switching unit forms a second data path between the PHY and the second MAC, and
   wherein if a printing job is received through the second data path and the image forming apparatus is operating in the power saving mode, the second data path is switched to the first data path so as to operate the image forming apparatus in the normal mode.

2. The image forming apparatus according to claim 1, wherein the switching unit comprises:
   a first flip-flop to transmit data to or to receive data from the PHY;
   a second flip-flop to transmit data to or to receive data from the first MAC;
   a third flip-flop to transmit data to or to receive data from the second MAC;
   a multiplexer (MUX) to transmit data selectively from the second flip-flop or the third flip-flop to the first flip-flop, or to transmit data from the first flip-flop selectively to the second flip-flop or the third flip-flop; and
   a selection unit to control the MUX according to data reception of the second flip-flop or the third flip-flop and according to the operation mode of the image forming apparatus.

3. The image forming apparatus according to claim 1, wherein the switching unit is provided in the second control unit.

4. The image forming apparatus according to claim 1, wherein the second control unit further comprises:
   a memory to store data transmitted from the communication interface unit; and
   a data processor to analyze and to process the stored data.

5. The image forming apparatus according to claim 4, wherein if the stored data are data related to the printing job, the data processor informs the first control unit that the printing job is received.

6. The image forming apparatus according to claim 5, wherein if the first control unit receives a message informing that the printing job is received from the second control unit, the first control unit reads out the data related to the printing job from the memory and prints the printing job.

7. The image forming apparatus according to claim 5, wherein if the first control unit receives a message informing that the printing job is received from the second control unit, the first control unit controls the communication interface unit to request retransmission of the data related to the printing job.

8. The image forming apparatus according to claim 1, wherein when the image forming apparatus is in the normal mode, the second control unit operates in a low power mode or is turned off.

9. The image forming apparatus according to claim 1, wherein the data path is connected through at least one Media Independent Interface (MII), Reduced Media Independent Interface (RMII), Gigabit Media Independent Interface (GMII) and Reduced Gigabit Media Independent Interface (RGMII).

10. A network connection method of an image forming apparatus which is connected to a network using a physical layer protocol (PHY) and operates in a plurality of operation modes, the method comprising:
    determining an operation mode of the plurality of operation modes of the image forming apparatus;
    forming a first data path between a first control unit, which includes a first Media Access Controller (MAC) to perform Media Access Control for the PHY when the image forming apparatus operates in a normal mode and which controls functions of the image forming apparatus, and the PHY;
    forming a second data path between a second control unit, which includes a second Media Access Controller (MAC) to perform Media Access Control for the PHY when the image forming apparatus operates in a power saving mode and which operates with lower power than the first control unit, and the PHY; and
    switching to the first data path or the second data path according to the determined operation mode of the image forming apparatus,
    wherein in the switching to the first data path or the second data path, if printing data are received through the second data path between the second MAC and the PHY and the image forming apparatus is operating in the power saving mode, the second data path is switched to the first data path so as to operate the image forming apparatus in the normal mode.

11. The method according to claim 10, wherein the determining of the operation mode of the plurality of operation modes is performed by the second control unit.

12. The method according to claim 10, further comprising:
    informing the first control unit with the second control unit that data related to a printing job are received.

13. The method according to claim 12, wherein in the informing the first control unit with the second control unit, the data related to the printing job are transmitted to the first control unit.

14. The method according to claim 12, further comprising:
    requesting with the first control unit that a network which transmitted the printing job retransmit the data related to the printing job.

15. The method according to claim 10, wherein the first data path and the second data path are connected through at least one Media Independent Interface (MII), Reduced Media Independent Interface (RMII), Gigabit Media Independent Interface (GMII) and Reduced Gigabit Media Independent Interface (RGMII).

16. A method of connecting an image forming apparatus to a network with a physical layer protocol (PHY), the method comprising:
    determining an operation mode of the image forming apparatus;

switching to a first data path between a first control unit of the image forming apparatus and the PHY when it is determined that the operation mode is a normal operation mode; and switching to a second data path between a second control unit and the PHY when it is determined that the operation mode is a power saving mode;

determining whether printing data is received through the second data path when the image forming apparatus is in the power saving mode; and switching to the first data path when it is determined that printing data is received through the second data path and operating the image forming apparatus in the normal mode.

17. The method of claim 16, further comprising:

requesting with the first control unit that the network that transmitted the printing data retransmit the printing data.

* * * * *